United States Patent [19]

Sims, Jr. et al.

[11] 3,752,513

[45] Aug. 14, 1973

[54] SELF-CENTERING SHAFT LOCKING KEY

[75] Inventors: Dewey M. Sims, Jr., Westland; Franklin H. Price, Jr., Troy, both of Mich.

[73] Assignee: Burroughs Corporation, Detroit, Mich.

[22] Filed: Aug. 26, 1971

[21] Appl. No.: 175,172

[52] U.S. Cl. ............................................ 287/52.08
[51] Int. Cl. ................................................ F16d 1/06
[58] Field of Search ..................... 287/52.08, 52.05, 287/53 TK, 53 LK

[56] References Cited
UNITED STATES PATENTS

| | | | |
|---|---|---|---|
| 2,444,922 | 7/1948 | Deetman | 287/52.05 |
| 864,989 | 9/1907 | Richards | 287/52.08 X |
| 2,926,033 | 2/1960 | Zarrillo | 287/52.05 |
| 3,549,182 | 12/1970 | Bogue | 287/52.08 |

*Primary Examiner*—Andrew V. Kundrat
*Attorney*—Paul W. Fish and Edwin W. Uren

[57] ABSTRACT

A locking device serving as a key for securing an annular member or hub against axial movement on a shaft and for repetitively self-returning the hub to an angular preset condition and thereafter holding the same against rotation relative to the shaft. The hub has a tapped radial hole through the center of which a transverse slot extends and in which the locking key is received. A set screw is threadedly advanced in the tapped hole to apply increasing pressure on the midportion of the locking key so that spaced parts of the key will contact the slot floor and a flat surface on the shaft creating moments of force which act in offset relation to the shaft's axis with the result that relative rotation of the shaft and hub will occur until a preset angular or home position is reached at which time the slot floor and the flat of the shaft extend parallel to one another.

13 Claims, 6 Drawing Figures

PATENTED AUG 14 1973    3,752,513

INVENTORS
DEWEY M. SIMS, JR.
FRANKLIN H. PRICE, JR.

3,752,513

SELF-CENTERING SHAFT LOCKING KEY

BACKGROUND OF THE INVENTION

1. Field of the Invention

The invention relates generally to devices for keying elements to shafts, and more particularly to the mounting of an annular member on a rotatable shaft for effectively securing the member in a preset angular position relative to the shaft.

2. Description of the Prior Art

Locking or clamping means have been used for securing and positioning elements such as bearings, pulleys and the like to their associated shafts for joint rotation therewith. It has been customary to provide keys and keyways formed in shafts and in the apertures of elements fitted on the shafts for establishing the desired angular and lateral positioning of the elements upon the shafts. Additionally there have been other well-known types of keying devices for the purpose of positioning and attaching elements in desired relationships with respect to shafts. For example, a hub or sleeve may be conventionally fixed to a shaft by using a set screw engageable with a corresponding flat-surfaced portion formed on the shaft. This type of construction, however, is not adequate for securing a cable winding drum in a preset angular position relative to a shaft, particularly where the function of the drums is to precisely control the movement of documents associated with document transport mechanisms of data processing systems.

Another aspect that must be considered is the problem of maintaining such a drum or hub in a consistent angular position on its shaft. The periodic adjustment of a drum and the re-tightening of its set screw is likely to cause wear of the set screw and other parts involved, making it more difficult to maintain a desired angular placement of the drum relative to the shaft. Furthermore, when the drum is laterally shifted along the shaft, to accommodate different sizes of documents, and then re-tightened, several adjustments or repositionings may be required, due to wear, before the drum can be tightened in the desired preset angular or home position. If the drum is not adjusted properly, skewing of documents could occur as they are moved along a prescribed transport path where they are machine read or recorded upon, thereby resulting in faulty or inaccurate recording and reading of data on the documents.

While conventional clamping or keying means have generally proven satisfactory, nevetheless, where precise it movement of documents is required, these expedients have been generally found to be ineffective when elements such as winding drums require either occasional or frequent repositioning on their associated drive shafts. Therefore, with concern for improved means for fixedly securing elements to a preset angular position on a shaft, the present invention was developed to provide a self-centering locking key capable of automatically returning a drum to its preset angular home position, as well as securely attaching if thereto.

SUMMARY OF THE INVENTION

The keying device of the present invention enables an element, such as a hub or drum, to be mounted on a shaft such that when a locking key is inserted into the element and secured therein, the key will bring the element into the correct preset angular relationship with the shaft.

Accordingly, it is an important object of the present invention to provide an improved self-centering keying device.

It is another important object of the invention to provide an improved locking key which is particularly useful in securing winding drums to their supporting shafts in environments where precise movement of documents is desired, as for example in document transport systems.

Another important object of the invention is to provide effective means for repetitively securing an element in a preset angular position with respect to its supporting shaft.

Still another important object of the present invention is to provide an improved releasable locking key of one-piece construction for effectively and conveniently securing a part on a supporting shaft in a desired angular and lateral position.

It is a related object of the invention to provide a resilient locking key that effectively engages both an element, such as a drum, and its driving shaft, upon installable insertion thereof, thereby causing relative rotation of the element and shaft to bring the element into a preset angular home position.

BRIEF DESCRIPTION OF THE DRAWINGS

These and other objects and aspects of the present invention will be more clearly understood from the following description of the drawings, specifications and appended claims, wherein:

DESCRIPTION OF A PREFERRED EMBODIMENT

Figure 4:
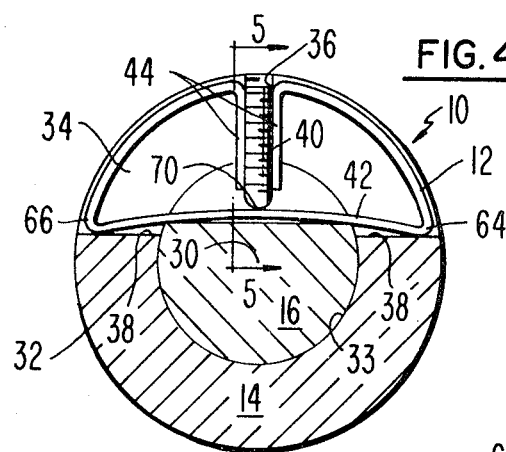
FIG. 4 is a view similar to FIG. 3 but showing the winding drum secured in the preset angular home position as established by the coaction of the locking key and set screw relative to the drum and drive shaft.
Figure 3:
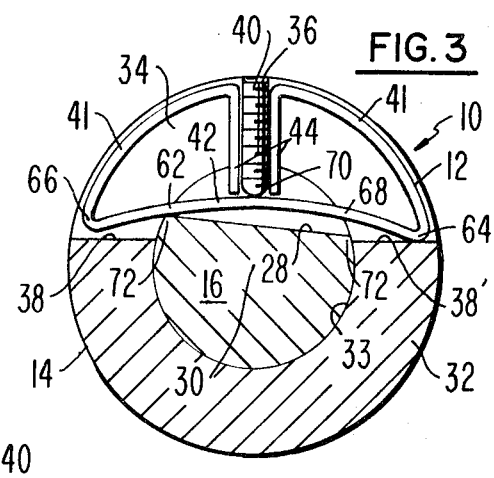
FIG. 3 is an enlarged transverse sectional view taken along the line 3—3 of FIG. 2 and illustrating the winding drum in an improper angularly displaced relationship relative to the drive shaft.

Referring to the drawings wherein the keying device, shown generally at 10 in FIGS. 3 and 4, comprises a locking key indicated at 12, which is used in combination with an annular member or winding drum 14 and a drive shaft 16. The locking key 12 is adapted for securing the winding drum 14 in a desired angular home position and if desired a longitudinal location on the shaft 16. The keying device 10 may be embodied in a document transport system of a data processing machine, for affording dual precise to and fro movements of sheet gripping mechanisms, concurrently in the same direction and at relatively high speeds, while holding the relative position with respect to one another, as is illustrated in FIG. 1.

Figure 1:
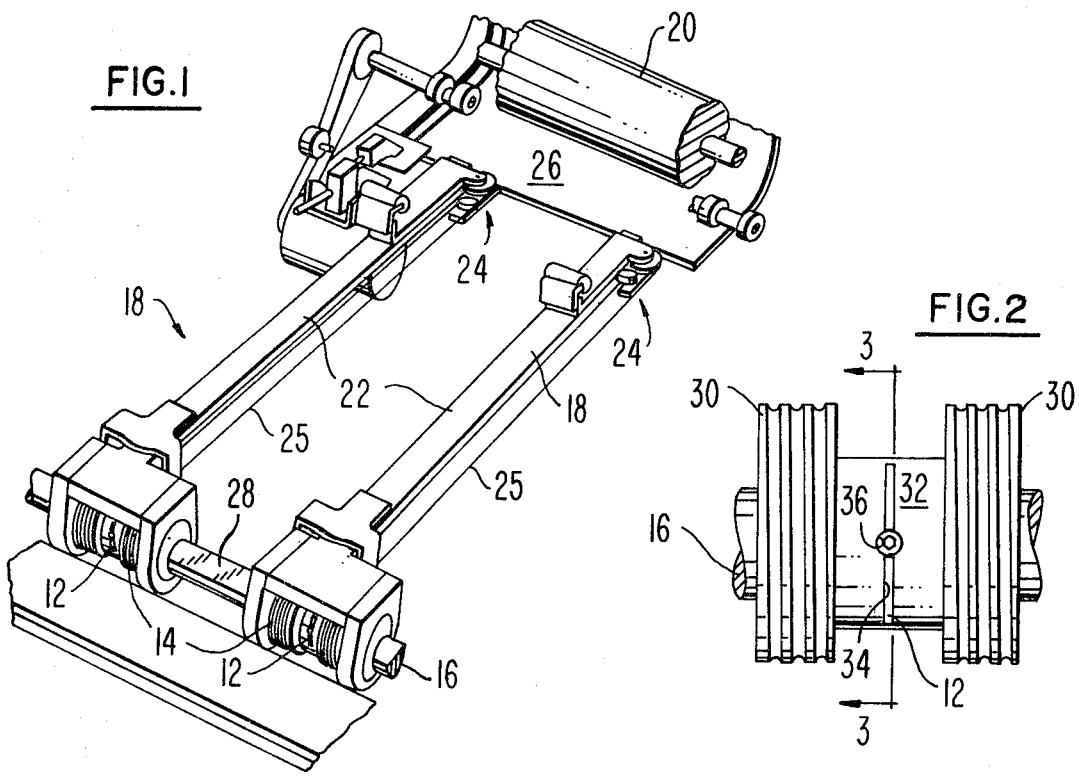
FIG. 1 is a perspective view of a document transport system of a data processing machine in which the invention is incorporated.

As shown in FIG. 1, the winding drum 14 may be employed in a document transport system which includes two similar elongated extending assemblies 18—18. These assemblies may extend from the rear of a machine towards the front thereof, and may be disposed adjacent to the area of a platen 20. Each assembly may include an elongated bar 22 forming a track member, and the rearmost portion of each bar may be supported by the drive shaft 16 extending parallel to the platen 20. Movable under each track member may be a sheet or document gripping device, generally indicated at 24, wherein each gripping device may travel either toward or away from the platen 20 and may be controlled by the direction of rotation of the shaft 16.

Therefore, the purpose of the locking key 12 is to maintain each of the gripping devices 24 aligned with each other with respect to the platen 20 as they move on their respective tracks, and even if they are repositioned laterally with respect to one another. The uniform to and fro motion of the gripping devices 24 may be accomplished by means of a cable system 25 associated with each of the track members. The cable system for each track may have an intermediate portion attached to the gripping device 24, and opposite end portions helically wound about separate portions of the winding drum 14 in opposite directions. In this way, a document 26 grasped by the cable controlled gripping devices 24—24 can be moved in a precisely defined pathway in either direction of its motion relative to platen 20.

A more detailed explanation of such a document transport system is disclosed in the copending U.S. Pat. application of Harold M. Frederick et al., Ser. No. 52,612, filed July 26, 1970 and titled DOCUMENT TRANSPORT SYSTEM, such application of common ownership herewith, disclosing the various characteristics and requirements of a document transport system to certain requirements of which the present invention is particularly adapted.

Figure 2:
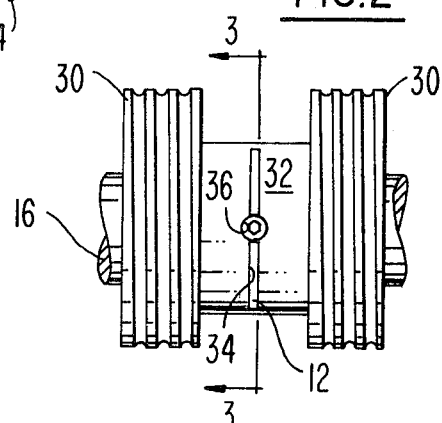
FIG. 2 is a plan view of a preferred embodiment of the invention illustrating a self-centering locking key in assembled relationship with a winding drum on a drive shaft.

As previously mentioned, and shown in FIGS. 1 and 2, the winding drum 14 is supported on the drive shaft 16, which may be connected to and driven by an electric motor and friction clutch assembly (not shown). Pursuant to the present invention, the shaft 16 is recessed to provide a longitudinally extending flat portion or surface 28 terminating in axially spaced apart side wall portions one of which is shown at 29 in FIG. 5. The recess has a depth preferably less than the radius of the shaft 16, as best shown in FIGS. 3 and 4. The axial length of the flat surface 28 of the shaft 16 should be sufficient to facilitate lateral adjustment of one or both of the winding drums 14—14, such that various sizes of documents or ledgers may be accommodated. Regardless of the axial length of the flat surface 28 of the shat 16, however, the locking key 12, upon installable insertion in the slot formed in the drum 14, will coact with both the drum and flatted surface of the shaft to securely establish a preset angular position and a predetermined axial placement of the drum on the shaft, as is described in more detail hereinafter.

Figures 5, 6:
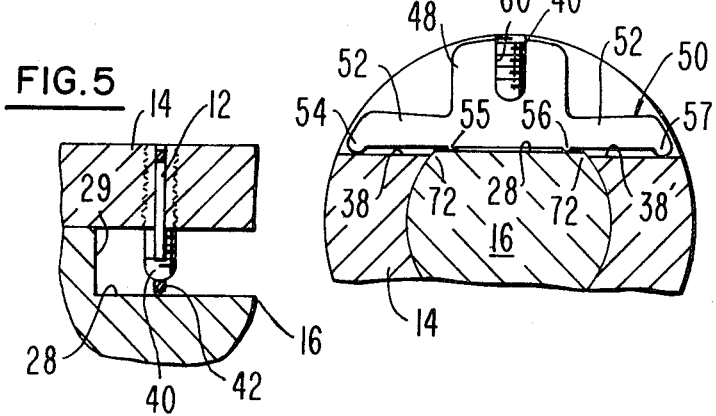
FIG. 5 is a partial sectional view taken along the line 5—5 of FIG. 4 and illustrating the relative sizes of the slot, the set screw, and the flat surface of the shaft.
FIG. 6 is a cross-sectional view of another embodiment of the invention showing an alternate form of locking key for positioning a winding drum in its proper position on a shaft.

As best shown in FIGS. 2 and 3, the winding drum 14 includes helically grooved sections 30—30 on opposite ends of a hub 32, and a bore 33 extending therethrough coaxial with the axis of the shaft. The hub 32 in turn is keyed or locked by the locking key or plate 12 to the shaft 16 to receive driving torque therefrom. The hub 32 has a transversely formed slot 34 and includes a tapped radial hole 36 located approximately in the center between the ends of the slot 34, as shown in FIG. 2. As shown in FIGS. 3 and 4, the slot 34 provides a planar surface or floor 38 and 38 on opposite sides of the bore 33. When the locking key is properly and securely fixed within the slot, the plane created by the floors 38 and 38 will be located between and parallel to the flat surface 28 of the shaft 16 and the central axis 30 of the shaft. The slot 34 is narrower than the diameter of the tapped hole 36, as shown in FIGS. 2 and 5. An actuating member or set screw 40 is threadable into the tapped hole 36 to provide the necessary force for securing or locking the winding drum 14 to the shaft 16 when in their properly assembled states.

In a preferred embodiment of the invention, the keying member 12 is of one-piece construction and shaped to slidably fit within the slot 34. It is provided with a concave bowed section 42 having contact portions 62, 64, 66 and 68, as best shown in FIGS. 3 and 4. On opposite ends of the bowed section 42 are symmetrically contoured arcuate sections 41—41 which are shaped to conform to the outer periphery of the hub or drum 32. Each of the contoured sections 41—41 is integrally connected to an inwardly directed end portion 44, such end portions defining a central body portion and serving as screw clamping members of the locking key 12 which are adapted to grip opposite sides of the set screw 40 as shown in FIG. 4.

Preferably, the locking key or plate 12 is made from sturdy, square cross-sectioned wire stock having the ability to yield under the pressures brought by the tightening of the set screw 40 as it bears against the central portion of the bowed section 42. When the key 12 is in its tightened state, serving to maintain the preset angular and predetermined lateral position of the drum 14 relative to the shaft 16, the several contact portions 62, 64, 66 and 68 will effectively distribute the pressures brought by the screw 40 against the floor 38—38 of the slot 34 and the terminating side edges of the flat surface 28, in the manner shown in FIG. 4. An advantage of square stock over circular or round stock is that it provides greater surface contact with the walls of the slot 34 and the flatted surface of the shaft 16. The utility of the forces brought by the screw 40 will be hereinafter described.

Another embodiment of the invention is illustrated in FIG. 6, wherein like reference characters are assigned to corresponding elements. In FIG. 6, there is shown a locking plate 50 of substantially T shaped formation, slightly resilient arms 52—52 thereof being integral with a stem or central body portion 48, the arms 52—52 extending away from the stem in opposite directions and in transverse relationship to the shaft's axis. The arms 52—52 have a plurality of ears 54, 55, 56 and 57 projecting therefrom, which serve as contact points for abutting the planar floor 38 and 38 of the slot and the flat surface 28 of the shaft 16, when the screw 40 is insertably tightened to bring the planar floors of the slot into parallel relationship with the flat surface 28 of the shaft. As evident in FIG. 6, the outermost ears 54 and 57 extend further than the inner ears 55 and 56 to provide an arched effect which self-centers the parts to the home position in the same manner as the previously described embodiment of the invention. The central body portion 48 of this embodiment is provided with a substantially rectangular cutout 60 opening out through one end thereof to receive the set screw 40. It is apparent that when the set screw 40 is threaded into the tapped hole 36 of the hub 32 it will advance radially inwardly to effectively center the locking plate 50, the head of the screw being advanced to a point inwardly disposed of the outer periphery of the hub 32 during the threading process. The locking key or plate 50 of this latter embodiment may be formed from thin metal or the like and be of such a thickness as to permit slidable entry into the slot 34.

OPERATION OF THE DEVICE

When used in connection with a winding drum 14 as shown in the drawings, as for example in a cable driven document transport system, the locking key or plate 12 of the first embodiment of the invention will serve effectively for establishing and securing the drum in a predetermined fixed home position relative to the rotatable drive shaft 16. Once the desired lateral positioning of one or both of the drums 14—14 has been manually set during the assembly thereof, such as to accommodate the desired width of the documents, the desired angular placement of the drum on the shaft is automatically set by tightening the set screw 40, thereby asserting a pressure upon the center 70 of the bowed section 42. The resulting moments of force applied by the bowed section 42 and in particular by the contact point 62 thereof against a higher corner 72 of the shaft 16, and by the contact portion 64 of the keying member 12 against the planar floor 38 of the slot of the drum 14, as shown in FIG. 3, will serve to cause a relative rotation of the drum and the shaft about the axis of the latter until these two parts assume the position shown in FIG. 4. As the force from the set screw 40 is increased against the center 70 of the keying member 12, in the tightening process, the bow of the bowed section 42 will responsively diminish and the forces applied thereby against the corners 72—72 of the shaft and against the floor 38—38 of the slot in the drum will effectively equalize. At this time the relative rotation of the drum and shaft will terminate. Accordingly, as the pressure of the screw 40 is increased, the drum 14 will be adjusted to a predetermined relationship with the shaft 16, at which time the planar floors 38—38 of the drum and the flat surface 28 of the shaft will be parallel to one another. In addition, the screw clamping portions 44—44 of the locking key 12 will be deflected toward one another to abut or engage opposite sides of the set screw 40 as shown in FIG. 4, and the bowed section 42 will apply a continuous spring loaded pressure on the set screw threads caused by the flattening of the bowed section as the screw is further threaded into the tapped hole 36, thereby preventing the set screw from loosening up in any circumstance.

The modified embodiment of the locking plate 50, illustrated in FIG. 6, is employed in generally the same manner as previously described in the preceding paragraphs. In FIG. 6, the plate 50 is shown in its properly and fully assembled state, wherein the contact portions or ears 54, 55, 56 and 57 are disposed in abutting relationship with their associated surfaces 38, 72—72, 38 respectively.

An added feature of this self-centering locking device is that its resiliency compensates for allowable tolerances in locating the slot depth in the drum and in locating the flat on the shaft. It should also be noted that with both embodiments of the invention, the ultimate effect of the set screw tightening will be realized gradually, such ultimate effect being a parallel relationship between the flat surface 28 of the shaft and the floor 38—38 of the slot, with the bottom edge of the locking device in secure contact with the edge points 72—72 and will the floors 38—38 of the slot 34.

While a preferred and alternate embodiment of the keying device have been shown and described in detail, it will be understood that various modifications are contemplated by the appended claims without departing from the true spirit and scope of the invention.

What is claimed is:

1. A self-adjusting drum and supporting shaft assembly including, in combination:

a shaft having a flat surface formed thereon, said flat surface being formed at a depth less than the radius of said shaft, an annular member mountable on said shaft, said member having a hub, a transverse slot having separated floor areas formed in said hub, and a hole radial thereto and arranged approximately central of said slot, said separated floor areas of said slot being in a plane disposed between and parallel to the axis of said shaft and said flat surface thereof when said annular member is secured to said shaft, an actuating element receivable in said hole and advanceable into said annular member, and a locking member insertable into said slot and attachable to said annular member by means of said actuating element, said locking member having a flexible leading insertable edge portion and a central body portion including an end opening passage for accommodating said actuating element upon insertion thereof into said hole of said annular member, said locking member being effective for assembling said annular member on said shaft in fixed relation therewith, said attachment of said locking member to said annular member being effective for securing said annular member to said shaft and for forcing said flexible leading insertable edge portion of said locking member into abutting relationship with said separated floor areas of said slot and with said flat surface of said shaft.

2. The drum and shaft assembly as defined in claim 1 wherein said hole of said annular member is internally threaded and said actuating element is externally threaded and threadedly engageable within said hole for radial advancement inwardly into said slot to thereby engage said locking member and to force the same into abutting relationship with said separated floor areas of said slot and with said flat surface of said shaft, said relationship defining a preset angular relationship of said annular member relative to said shaft.

3. The drum and shaft assembly as defined in claim 2 wherein said externally threaded actuating element is a screw rounded on its leading end for compressing said locking member against said drum and said shaft.

4. The drum and shaft assembly as defined in claim 3 wherein said annular member is a winding drum having helical grooves for windably receiving a cable thereon.

5. The drum and shaft assembly as defined in claim 1 wherein said annular member is rendered adjustable along the axis of said shaft upon partial withdrawal of said actuating element from said hole, the extent of said adjustment being limited only by the axial length of said flat surface formed on said shaft.

6. The drum and shaft assembly as defined in claim 1 wherein said locking member is constructed of flexible wire of square cross-section and said leading insertable edge portion thereof presents a bridging portion against which the actuating element exerts pressure as it is threadably advanced into said threaded hole of said annular member, and wherein said end opening passage of said central body portion includes inwardly directed end portions disposed on opposite sides of said actuating element to serve as a retaining clamp therefor.

7. The drum and shaft assembly as defined in claim 1 wherein said locking member is constructed of resilient material so as to yield to the pressures exerted by said actuating element and said flexible leading insertable edge portion thereof is provided with a plurality of outboard and inboard contact portions for abutment against said separated floor areas of said slot of said hub and said flat surface of said shaft, respectively.

8. A locking key for detachably securing a hub having a slot to a shaft recessed for receiving the key, said locking key comprising:
a set screw,
a keying member of one piece flexible square wire construction insertable into the slot formed in said hub, said member having a trailing insertable edge portion shaped to provide an end opening passage for receiving said set screw the axis of which lies in the plane of the member, the thickness of said member, at least in the region of said passage, being less than the diameter of said set screw such that the threads of said set screw may be engaged in a tapped hole formed in the slot of said hub, and said member additionally comprising identically shaped lateral extensions intergrally connected to said trailing insertable edge portion and extending outwardly in opposite directions from said end opening passage for receipt in the slot of the hub, said extensions being integrally connected to a bridging portion defining a leading insertable edge of said member, said bridging portion extending across said end opening passage to form an abutment against which the set screw can exert pressure as it is threadably advanced into the tapped hole of said hub, said pressure serving to secure said hub to said shaft by the cooperating action of the lateral extensions of the member in the hub slot and said bridging portion of said member against said recess formed in the shaft.

9. The locking key as defined in claim 8 wherein said bridging portion is flexible and concavely shaped.

10. The locking key as defined in claim 8 wherein said trailing insertable edge portion and particularly said end opening passage thereof presents a central body portion including inwardly directed end portions disposed on opposite sides of said set screw to serve as a retaining clamp therefor when said bridging portion of said member is compressibly activated relative to said recess formed in said shaft.

11. A self-adjusting drum and supporting shaft assembly including, in combination:
a shaft having a flat surface formed thereon, said flat surface being formed at a depth less than the radius of said shaft,
an annular member mountable on said shaft, said member having a hub, a transverse slot having separated floor areas formed in said hub, and a tapped hole radial thereto and arranged approximately central of said slot, said separated floor areas of said slot being in a plane disposed between and parallel to the axis of said shaft and said flat surface thereof when said annular member is secured to said shaft,
a threaded actuating element receivable in said tapped hole and advanceable into said annular member, and
a locking member insertable into said slot and attachable to said annular member by means of said actuating element, said locking member being formed of resilient material comprising a central body portion having an end opening passage for receiving said actuating element and a flexible insertable leading edge portion having a plurality of outboard and inboard contact portions effective for compressibly contacting said separated floor areas of said hub and said flat surface of said shaft, respectively, upon forceable insertion of said threaded actuating element into said end opening passage of said locking member and said tapped hole of said annular member, said compressible contacting of said contact portions of said leading edge portion with said floor areas of said hub and said flat surface of said shaft providing a self-centering characteristic wherein said annular member is rotated relative to said shaft to thereby render said floor areas of said hub slot parallel with said flat surface of said shaft.

12. The self-adjusting drum and supporting shaft assembly defined in claim 11 wherein said outboard contact portions of said leading edge portion of said locking member are larger than said inboard contact portions thereof.

13. The self-adjusting drum and supporting shaft assembly defined in claim 11 wherein the resiliency of said resilient material of said locking member is such that the compressible contact of said contact portions of said locking member against said separated floor areas of said annular member and said flat surface of said shaft is effective to constrict said end opening passage of said central body portion of said locking member to thereby serve as a retaining clamp for said actuating element.

* * * * *